T. A. SHINN.
Graduated Glass or Jar.
No. 230,075.  Patented July 13, 1880.
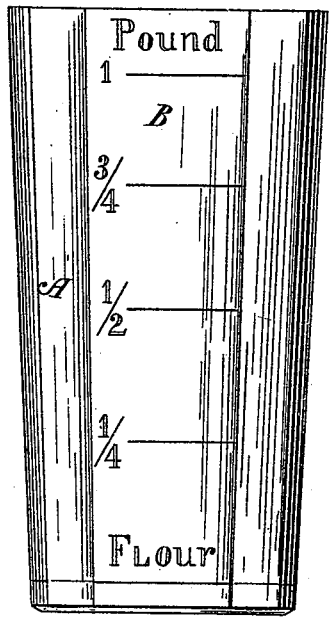
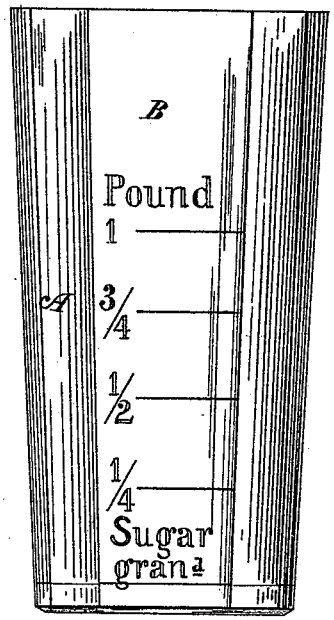
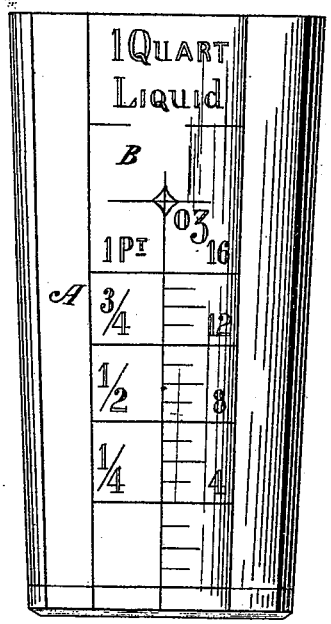
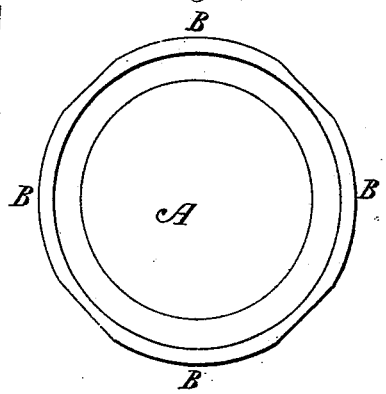
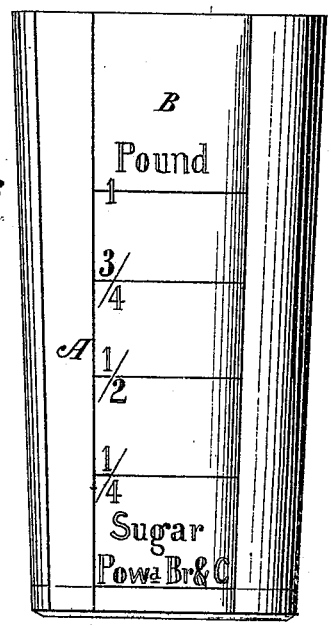

UNITED STATES PATENT OFFICE.

THORNTON A. SHINN, OF REMINGTON, ASSIGNOR OF ONE-HALF OF HIS RIGHT TO RICHARD E. BREED, OF PITTSBURG, PENNSYLVANIA.

GRADUATED GLASS OR JAR.

SPECIFICATION forming part of Letters Patent No. 230,075, dated July 13, 1880.

Application filed June 28, 1877.

*To all whom it may concern:*

Be it known that I, THORNTON A. SHINN, of Remington, in the county of Beaver and State of Pennsylvania, have invented a new and useful article pertaining to household furnishment, which I denominate a "Graduated Glass or Jar," which invention is fully set forth in the following specification, reference being had to the accompanying drawings.

The object of my invention is to provide for household use an article whereby such culinary operations as the baking of fancy bread and cake, preserving, pickling, and many other operations of the kitchen may be greatly facilitated by substituting for the slow and tedious process of weighing the various ingredients the more speedy operation of measuring them by the use of a graduated vessel provided with a series of scales upon its outer face which shall approximate sufficiently near to the weight of the material measured to answer all useful purposes of the weighing apparatus and set of measures usually required for this purpose; and the invention consists in providing a polygonal vessel, of glass or other suitably transparent material, with a series of scales, each of which shall give the weight or measure of the various articles which may be placed within it, and for which scales are provided upon its outer faces, as will be hereinafter fully described, and then specifically pointed out in the claim.

In the drawings, Figure 1 presents a side view of a vessel provided with a scale for the measurement of flour; Fig. 2, a similar view of one having a scale for giving the weight of a certain bulk of granulated sugar; and Fig. 3 shows the scale for other varieties of sugar. Fig. 4 represents a graduation for the measurement of liquids, and Fig. 5 is a top or plan view of the vessel, showing the arrangement of the several graduated faces around its sides.

A represents a glass measuring-vessel, similar in shape to the common glass drinking-tumbler and having curved surfaces B upon four or more of its sides, each of which is furnished with a scale for determining the weight or quantity of a certain article of merchandise placed within the vessel.

In constructing these vessels I prefer to use a mold of proper configuration to form the outside of the vessel and having the various scales and graduations cut or engraved upon its several inner faces, so that when the molten glass of which the vessel is to be formed is forced into it by a follower of the shape of the interior of the vessel, it shall have imparted to it all the scales and graduations engraved upon the mold without further manipulation.

Other forms than that shown in the figures might be used, but this possesses the advantage of being regular in outline, easily releasing itself from the mold, and requiring but a slight change in the bulk of its contents to be readily perceived by the user, which would not be the case were it of less depth compared to its diameter.

It is evident that the vessel might be constructed of metal with vertical strips of glass, mica, or other transparent material inserted in its sides, through which the height of the article being measured could be observed; but this method of construction greatly increases the cost, and the material lacks the cleanliness and purity of glass.

Vessels might also be made entirely of an opaque material with the scales upon the interior; but these would be subject to the same objections as those made partly of metal, with the additional one of being very difficult to clean upon the inside, as the scales must either project or be engraved upon the material, either of which would be objectionable.

I am aware that measuring-glasses for druggists' use in measuring liquids having the scale engraved upon the glass have been constructed; but this process of manufacture is costly, and would not answer for articles intended for general use; and further they could not be used for determining the weight of the various articles placed in them upon a simple inspection of the scale appropriate to that article.

I am aware that as an article of manufacture a wet and dry measure stamped up from sheet metal in suitable dies, with lines and words marked on the inside thereof indicating the weight and measure of its contents, is claimed by another. Such vessel is not of my invention, and I do not claim it; but,

Having thus described my invention, I claim as new, and desire to secure by Letters Patent of the United States, the following:

A new article for household use, consisting of a transparent vessel having the several graduated scales of weight and measure, as and for the purpose shown and described.

THORNTON A. SHINN.

Witnesses:
JOHN BURKE,
JOHN P. CLARKE.